(12) United States Patent
Miyachi

(10) Patent No.: US 10,353,423 B2
(45) Date of Patent: Jul. 16, 2019

(54) JOYSTICK

(71) Applicant: Sakamoto Electric Works Co., Ltd., Fukuoka-shi, Fukuoka-ken (JP)

(72) Inventor: Masaru Miyachi, Fukuoka (JP)

(73) Assignee: SAKAMOTO ELECTRIC WORKS CO., LTD., Fukuoka (JP)

( * ) Notice: Subject to any disclaimer, the term of this patent is extended or adjusted under 35 U.S.C. 154(b) by 57 days.

(21) Appl. No.: 15/354,079

(22) Filed: Nov. 17, 2016

(65) Prior Publication Data

US 2017/0139437 A1    May 18, 2017

(30) Foreign Application Priority Data

Nov. 18, 2015    (JP) .................................. 2015-239711

(51) Int. Cl.

| | | |
|---|---|---|
| *G05G 1/04* | (2006.01) | |
| *F16H 59/02* | (2006.01) | |
| *G05G 25/04* | (2006.01) | |
| *G05G 9/047* | (2006.01) | |
| *H01H 25/04* | (2006.01) | |

(52) U.S. Cl.
CPC ............. *G05G 9/047* (2013.01); *F16H 59/02* (2013.01); *G05G 1/04* (2013.01); *G05G 25/04* (2013.01); *H01H 2025/046* (2013.01)

(58) Field of Classification Search
CPC ......... G05G 9/047–2009/04714; G05G 25/04; G05G 2009/04711; H01H 25/04; H01H 2025/046; H01H 2221/012; F16H 59/0213; F16H 2059/0269

USPC ............ 74/471 XY, 473.32, 473.34; 345/161
See application file for complete search history.

(56) References Cited

U.S. PATENT DOCUMENTS

| | | | | |
|---|---|---|---|---|
| 1,796,106 | A | * 3/1931 | Johnson ................. | B60K 20/02 403/129 |
| 1,866,309 | A | * 7/1932 | Johnson ................ | B60R 25/007 192/82 R |
| 1,952,876 | A | * 3/1934 | Stannie ............... | F16H 59/0213 180/90.6 |
| 4,104,929 | A | * 8/1978 | Kessmar ............... | F16H 59/042 74/473.21 |

(Continued)

FOREIGN PATENT DOCUMENTS

| | | | | |
|---|---|---|---|---|
| DE | 10150192 A1 | * 4/2003 | ......... | F16H 59/0213 |
| GB | 2465355 A | * 5/2010 | ............. | G05G 9/047 |

(Continued)

*Primary Examiner* — Jake Cook
*Assistant Examiner* — Bobby Rushing, Jr.
(74) *Attorney, Agent, or Firm* — Staas & Halsey LLP

(57) ABSTRACT

A joy stick includes a main portion has a switch. An operation pole capable of rotating and inclining in the X-axis and the Y-axis directions. A sealing table constitutes a part of sphere on an upper surface of said main portion. The joy stick has an annular sealing plate on the sealing table, which curves so as to constitute a part of the sphere. A lower surface of the sealing plate is in contact with the sealing table. A circular sealing lid is mounted on a lower surface of the operation pole, and the sealing lid is in contact with an upper surface of the sealing plate so as to cover the sealing plate. Thereby, a clearance between the operation pole and the sealing table is closed by the seal lid and the sealing plate. A wide rotation range of the operation pole is achieved by the movable sealing plate.

18 Claims, 4 Drawing Sheets

(56) References Cited

U.S. PATENT DOCUMENTS

| | | | | |
|---|---|---|---|---|
| 4,266,438 | A * | 5/1981 | Kessmar | F16H 59/042 74/473.34 |
| 6,509,535 | B2 * | 1/2003 | Nakamura | G05G 9/047 200/335 |
| 8,263,882 | B2 * | 9/2012 | Laurent | G05G 9/04737 200/6 A |
| 8,471,815 | B2 * | 6/2013 | Jaouen | G05G 5/05 345/156 |
| 2007/0006677 | A1 * | 1/2007 | Roussin-Bouchard | G05G 1/06 74/471 XY |
| 2013/0162419 | A1 * | 6/2013 | Chang | G05G 9/047 340/407.2 |

FOREIGN PATENT DOCUMENTS

| | | |
|---|---|---|
| JP | 11-161419 | 6/1999 |
| JP | 2001-350581 | 12/2001 |

* cited by examiner

JOYSTICK

CROSS-REFERENCE TO RELATED APPLICATIONS

This application is based upon and claims the benefit of priority from the prior Japanese Patent Application No. 2015-239711 filed on Nov. 18, 2015, the entire contents of which are incorporated herein by reference.

BACKGROUND

1. Field

The present invention relates to a joy stick, which potentially could be used for operation of a crane, a game machine, etc.

2. Description of the Related Art

Conventionally, the joy sticks used for a crane, operation of a game, etc. have a bellows-like rubber bellows for closing a clearance between an operation pole and a main portion. Owing to the rubber bellows, foreign substances such as dust are prevented from falling into the main portion from the clearance.

Japanese Paten Laid-open Publication Heisei 11-161419 shows an example of such a joy stick that has a rubber bellows. The joy stick used for operation of a crane has a bellows-like rubber bellows. Since a movable range of the operation pole is wide in comparison with a central axis thereof, the movable range is insufficient only in elasticity of rubber.

The clearance between an operation pole and a main portion is closed by the rubber bellows, and dust, etc. can be prevented from entering in the main portion. Also, the movable range of operation pole can be enlarged. However, such device has a problem that the rubber bellows is torn with degradation of rubber and by hardening under low temperature.

The joy stick shown in Japanese Patent Laid-open Publication 2001-350581 has a key stem which has a spherical-surface portion. Since this portion slides, the above problem has been solved without using the rubber bellows.

SUMMARY

Additional aspects and/or advantages will be set forth in part in the description which follows and, in part, will be apparent from the description, or may be learned by practice of the invention.

The technology shown in the above-mentioned Japanese Patent Laid-open Publication 2001-350581 does not indicate a technology for enlarging a movable range of the operation pole. That is, in many cases, a high operability of the joy stick is requested as one of the request matters for the joy stick. For this reason, a movable angle of the operation pole is requested to be large. For example, if the movable angle of the operation pole is large, operations of moving quickly the crane operated by the joy stick to an object position, making the object position control finely and so on become easy.

In a view of the above technologies, the inventor proposes a joy stick which has a simple structure, has a long life and has a wide movable range of the joy stick.

The proposed joy stick has a main portion which has electric operating portion such as a switch, etc. and an operation pole which can rotate and incline in the X-axis and Y-axis directions. On the upper surface of the main portion, a sealing table which constitutes a spherical part is provided. The stick also has an annular sealing plate which curves so as to constitute a part of the spherical portion and provides with an aperture in the center thereof. A lower surface of the sealing plate is in contact with the sealing table. A circular sealing lid is provided with the operation pole. A lower surface of the circular sealing lid constitutes a part of a sphere to be is in contact with an upper surface of the sealing plate. A spherical surface of the sealing table, upper and lower surfaces of the sealing plate and a spherical surface of the lower face of the circular sealing lid are in consistent with a virtual spherical surface which is constituted by rotation of the operation pole in the X-axis and Y-axis directions. A diameter of the central aperture hole of the sealing plate is smaller than the diameter of the sealing lid.

In the proposed joy stick, if the operation pole is moved in the X-axis and Y-axis directions, in a specific moving range, the operation pole moves inside the central aperture of the sealing plate. Since, in the movement, the lower surface of the sealing lid and the upper surface of the sealing plate are in contact with each other so that the aperture of the sealing plate is covered with the sealing lid, foreign substances such as dust do not enter in the main portion.

If the operation pole is moved further in the X-axis and Y-axis directions, the sealing plate is moved according to movement of the operation pole and the sealing plate slides on an upper surface of the sealing table of the main portion. Thereby, the movable range of the operation pole can be enlarged.

Especially, with the proposed joy stick, since the sealing table is covered with the sealing plate and the sealing plate is covered with the sealing lid, if even if fluids such as juice and coffee, etc. spills, the joy stick can prevent the fluid from entering into the main portion.

That is, while the joy stick of the present invention has the operation pole which has the movable range equivalent to a joy stick sealed with the bellows-like rubber bellows, there is no fear of being torn like a rubber bellows. Also, the sealing table which is one of the constituting members of the joy stick can be made from a molded resin, the sealing plate can be made from a pressed metal plate such as a stainless steel and/or iron plate, and the joy stick can be manufactured very cheaply. Since the sealing lid is made integrally with the operation pole in resin molding, a special manufacturing method is not required for it, and mass production naturally can manufacture it cheaply and with high quality.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
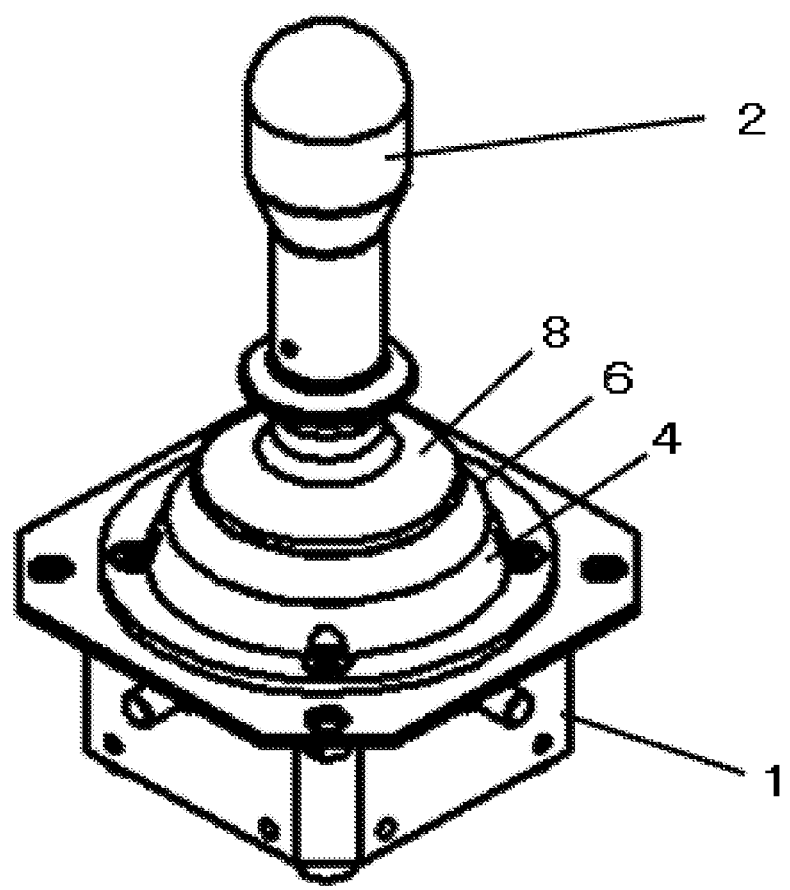
FIG. 1 shows a perspective view of a first embodiment of the proposed joy stick.
Figure 2:
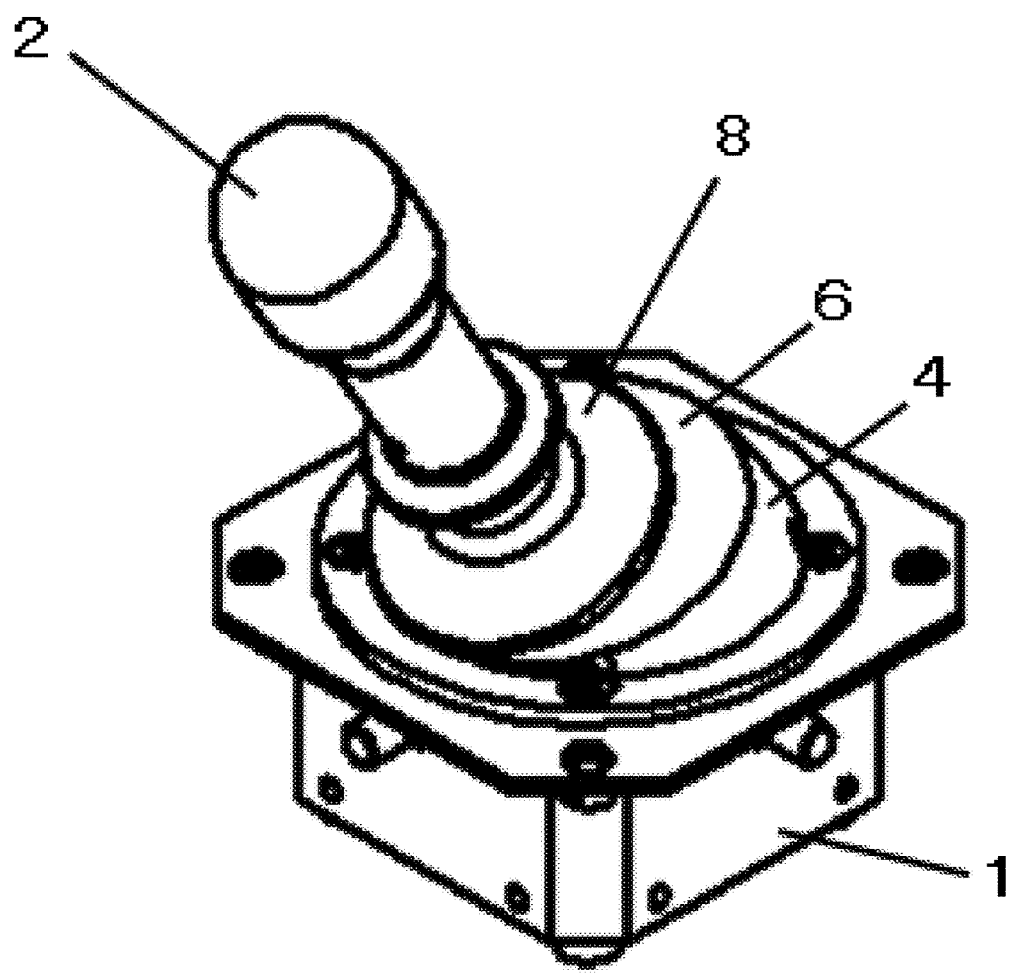
FIG. 2 shows a perspective view of the first embodiment of the joy stick.
Figure 3:
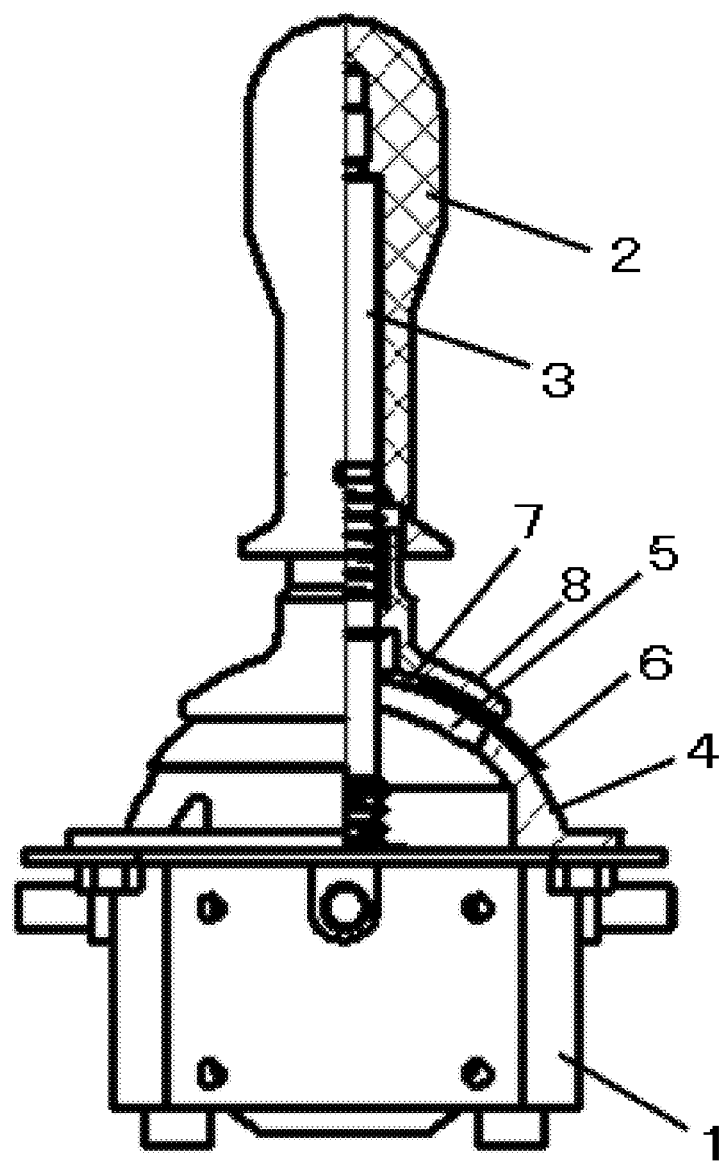
FIG. 3 shows a side-broken sectional view of the first embodiment of the joy stick.

Reference will now be made in detail to the embodiments, examples of which are illustrated in the accompanying drawings, wherein like reference numerals refer to the like elements throughout. The embodiments are described below to explain the present invention by referring to the figures.

The proposed joy stick has a main portion which has electric operating portion such as a switch, etc. and an operation pole which can rotate and incline in the X-axis and Y-axis directions. On the upper surface of the main portion, a sealing table which constitutes a spherical part is provided. The stick also has an annular sealing plate which curves so as to constitute a part of the spherical portion and provides with an aperture in the center thereof. A lower surface of the sealing plate is in contact with the sealing table. A circular sealing lid is provided with the operation pole. A lower surface of the circular sealing lid constitutes a part of a sphere to be is in contact with an upper surface of the sealing plate. A spherical surface of the sealing table, upper and lower surfaces of the sealing plate and a spherical surface of the lower face of the circular sealing lid are in consistent with a virtual spherical surface which is constituted by rotation of the operation pole in the X-axis and Y-axis directions. A diameter of the central aperture of the sealing plate is smaller than the diameter of the sealing lid. In operation, the movable range of the operation pole can be enlarged without using the rubber bellows. A phrase of "the movable range of an operation pole is large" in this specification means that the movable range is larger than a case where the sealing plate is not used in a joy stick. That is, the movable range of operation pole without using the seal plate is within an opening provided in the sealing table. Also, the size of the opening must be below a diameter of the seal lid, and the size of the opening is determined naturally.

The preferred embodiments of the proposed joy stick are explained along with figures as follows. A reference number 1 denotes a main portion which may be made from aluminum die-casting. The main portion accommodates some members to be operated such as a switch (not shown). Also, the main portion accommodates a support member (not shown) etc., which supports a shaft 3 of operation pole 2 in a state where the shaft 3 can be rotated in the X-axis and the Y-axis directions. A sealing table 4 made from resin molding is provided on an upper surface of the main portion 1. An upper surface of the sealing table 4 constitutes a part of a sphere, and a circular or square opening 5 (also referred to as aperture 5) is provided in a center of the sealing plate. The shaft 3 of the operation pole penetrates through the opening so that the shaft can move in the X-axis and the Y-axis directions freely within a predetermined angle.

The joy stick provides a seal plate 6 (also referred to as sealing plate 6) made from press processing in a metal plate so that it might be reversed in the sealing table 4. That is, the seal plate 6 has also a shape which constitutes a part of a sphere, and a curvature of a lower surface of the sealing plate corresponds with a curvature of an upper surface of the sealing table 4. The sealing plate has a circular shape on the outer periphery and provides a circular hole (aperture) 7 though which the operation pole 2 penetrates a center of the aperture so that the seal plate 6 can move freely in the X-axis and the Y-axis directions. The sealing plate has an annular shape because the periphery is circular and the sealing plate has a circular hole 7 in the center thereof. This seal plate 6 is freely slidable on the upper surface of sealing table 4.

As stated above, the seal plate 6 can slide and can be moved on the upper surface of sealing table 4. The moving range is until an end of seal plate 6 arrives at an end of the surface of a sphere of sealing table 4. In a state where the end of seal plate 6 arrives at the end of the surface of the sphere of the sealing table 4, an end of the opposite side edge of the seal plate 6 is in the state where the end covers the aperture 5 of the sealing table 4. That is, even if the seal plate 6 moves to an end, the opening 5 of the sealing table 4 is still completely closed by the seal plate 6.

A seal lid 8 (also referred to as sealing lid 8) is provided in the lower end of operation pole 2. A lower surface of this seal lid 8 has a shape which constitutes a part of sphere, and its curvature corresponds with a curvature of the upper surface of seal plate 6. A curvature of the surface of a sphere at an lower surface of the seal lid 8 is constituted so that it may correspond with a surface of a virtual sphere which is constituted along with rotation of the X-axis and the Y-axis directions of the operation pole 2.

By these constitutions, the seal lid 8 can be stuck with the upper surface of seal plate 6 in every position of movement of the X-axis and Y-axis directions of the operation pole 2 and can prevent invasion of dust. Also, the outside of seal lid 8 has a circular shape, and the diameter thereof is larger than a circular hole 7 of the seal plate 6. Therefore, the circular hole (aperture) 7 of seal plate 6 is in a state where the circular hole 7 is closed by the seal lid 8 of the lower end of operation pole 2.

The proposed joy stick is constituted as the above, and the operation of the joy stick is explained as below. A user, by griping the operation pole 2, rotates the operation pole 2 in the X-axis or the Y-axis direction to operate members to be operated such as a switch in the main portion 1. By this operation, a crane. etc. is moved to the target position.

Figure 4:
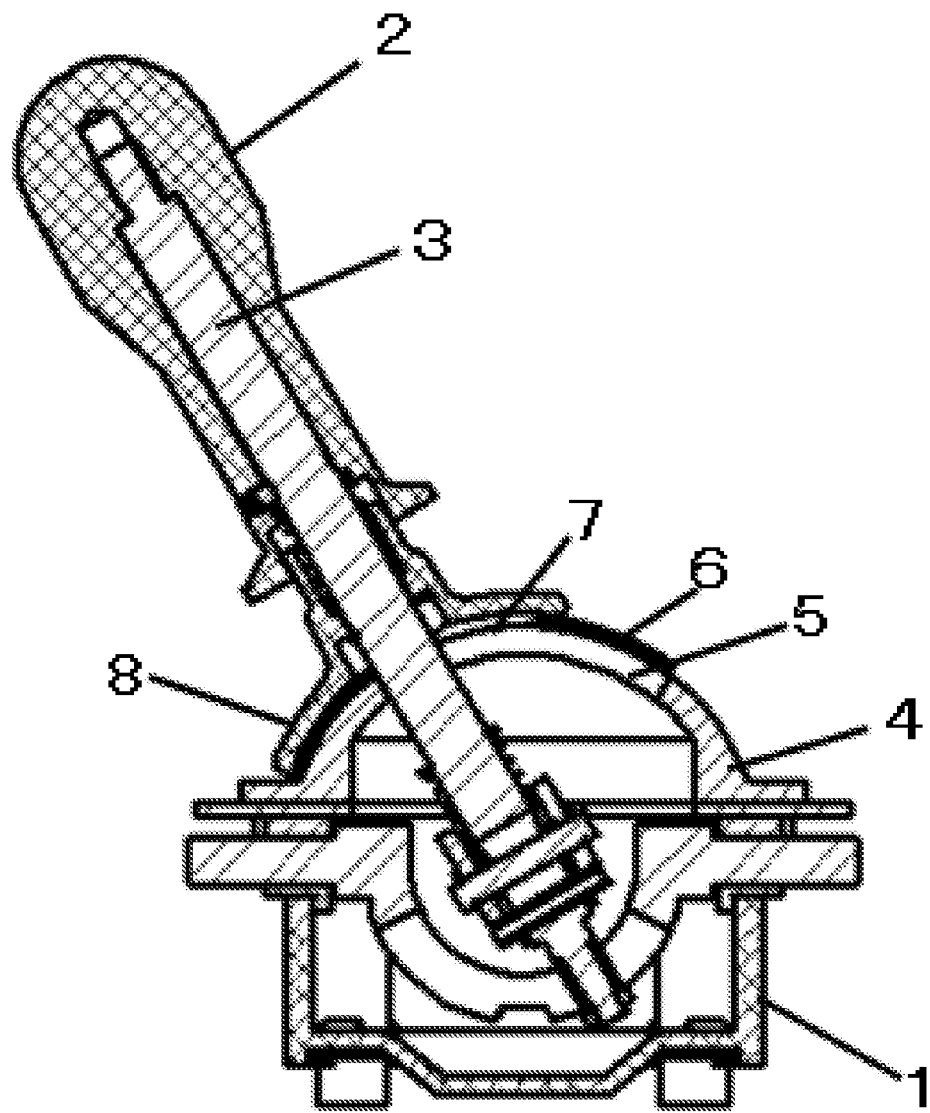
FIG. 4 shows a sectional side elevation of the first preferred embodiment of the joy stick.

Here, if within a certain level of the operating range, the shaft 3 moves in an inside of the circular hole 7 of seal plate 6. And if the operation range of operation pole 2 becomes large, the shaft 3 is in contact with an inner edge of the circular hole 7 of the sealing plate 6, then, the sealing plate 6 moves in accordance with a movement of the operation pole 2. If the operation pole 2 reaches into the greatest moving range, a state shown in FIG. 4 occurs. That is, the seal plate 6 slides on the upper surface of the sealing table 4, and moves to the end of the movable range of the seal plate 6.

Since the end of seal plate 6 is set as the size which covers the aperture 5 of the sealing table 4 even if the shaft moves to the end of the movable range of the seal plate 6 as shown in Drawing 4, neither dust nor a foreign substance goes into the aperture 5. Furthermore, since the sealing plate 6 is not made from materials which are torn easily such as rubber, it is long lasting.

The proposed joy stick can be used for operation of a crane, a game machine, etc. The inventor's proposals can provide the long lasting joy stick since it is not made from materials which are torn easily such as rubber.

Since the clearance between the operation pole 2 and the main portion 1 is not formed by this constitution, there is a low probability that dust etc. will invade the main portion 1, unexpected failure becomes low, and safety increases. If the joy stick is used for operation of a large-sized crane etc. such as those used in harbors, iron mills and shipyards, serious injury can occur is the joy stick breaks down. If used for this purpose, the proposed joy stick can reduce the chance of injury.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A joy stick comprising:
   an operation pole capable of inclining in X-axis and Y-axis directions;

a main portion having parts to be operated and a switch, an end of the operation pole being mounted in the main portion;

a sealing table curving so as to constitute part of a sphere, the sealing table being provided on an upper surface of the main portion, the sealing table being mounted on and stationary with respect to the main portion;

an annular sealing plate curving so as to constitute part of a sphere, the sealing plate having a central aperture in a center thereof, a lower surface of the sealing plate being in contact with the sealing table; and a circular sealing lid mounted on the operation pole, wherein a lower surface of the sealing lid is in contact with an upper surface of the sealing plate, a spherical surface forming the lower surface of the sealing lid is consistent with a virtual sphere which is constituted by rotation of the operation pole in X-axis and Y-axis directions, and a diameter of the central aperture of the sealing plate is smaller than a diameter of a radially outward surface of the sealing lid, wherein the sealing plate is positioned between the sealing lid and the sealing table such that an upper surface of the sealing plate contacts the sealing lid and the lower surface of the sealing plate contacts an upper surface of the sealing table, and the upper surface of the sealing table is continuous from where the sealing table contacts the sealing plate to the main portion, such that the upper surface of the sealing table slopes away from the sealing plate until the sealing table meets the main portion.

2. A joy stick according to claim 1, wherein the sealing plate is made from a metal plate by pressing.

3. A joy stick according to claim 1, wherein the sealing lid is molded integrally with the operation pole.

4. A joy stick according to claim 1, wherein the central aperture of the sealing plate is covered by the sealing lid with the sealing table, the sealing plate and the sealing lid layered in this order.

5. A joy stick according to claim 1, wherein the sealing table is made from a molded resin.

6. A joy stick according to claim 1, wherein the sealing table, the sealing plate and the sealing lid have spherical surface portions such that when the sealing table, the sealing plate and the sealing lid are layered in this order, the sealing table, the sealing plate and the sealing lid have substantially parallel spherical surface portions.

7. A joy stick comprising:
an operation pole capable of inclining in X-axis and Y-axis directions;
a main portion having a switch, an end of the operation pole being mounted in the main portion;
a sealing table having an upper surface that curves so as to constitute part of a sphere, the sealing table being provided on and connected to an upper surface of the main portion;
an annular sealing plate provided on the sealing table, the sealing plate having curved upper and lower surface portions which each constitute part of a sphere, the sealing plate having a central aperture in a center thereof, the lower surface portion of the sealing plate having a curvature matching a curvature of the upper surface of the sealing table, the lower surface portion of the sealing plate being in contact with the upper surface of the sealing table, the sealing plate being movable with respect to the sealing table when the operation pole inclines in the X-axis or Y-axis directions; and
a circular sealing lid mounted on and stationary with respect to the operation pole, the sealing lid having a curved lower surface portion which constitutes part of a sphere, the lower surface portion of the sealing lid having a curvature matching a curvature of the upper surface portion of the sealing plate, the sealing lid having an outer diameter larger than the central aperture of the sealing plate so that the sealing lid covers any gap between the operation pole and the sealing plate, the lower surface portion of the sealing lid being in contact with the upper surface portion of the sealing plate, wherein
the sealing plate is movable with respect to both the sealing lid and the sealing table, and
the upper surface of the sealing table is continuous from where the sealing table contacts the sealing plate to the main portion, such that the upper surface of the sealing table slopes away from the sealing plate until the sealing table meets the main portion.

8. A joy stick according to claim 7, wherein the operation pole has a diameter smaller than a diameter of the central aperture of the sealing plate such that the operation pole is movable inside the central aperture of the sealing plate while the sealing lid covers any gap between the operation pole and the sealing plate.

9. A joy stick according to claim 7, wherein the sealing plate is made from a metal plate by pressing.

10. A joy stick according to claim 7, wherein the sealing lid is molded integrally with the operation pole in a resin molding process.

11. A joy stick according to claim 7, wherein the central aperture of the sealing plate is covered by the sealing lid with the sealing table, the sealing plate and the sealing lid layered in this order.

12. A joy stick according to claim 7, wherein the sealing table is made from a molded resin.

13. A joy stick comprising:
an operation pole capable of inclining in X-axis and Y-axis directions;
a main portion having a switch, an end of the operation pole being mounted in the main portion;
a sealing table having an upper surface portion that curves so as to constitute part of a sphere, the sealing table being provided on and connected to an upper surface of the main portion;
an annular sealing plate provided on the sealing table, the sealing plate having curved upper and lower surface portions which each constitute part of a sphere, the sealing plate having a central aperture in a center thereof, the lower surface portion of the sealing plate having a curvature matching a curvature of the upper surface of the sealing table, the lower surface portion of the sealing plate being in contact with the upper surface of the sealing table, the operation pole being movable with respect to the sealing plate such that within the central aperture, the operation pole can freely move in the X-axis and Y-axis directions without the sealing plate moving with the operation pole; and
a circular sealing lid mounted on and stationary with respect to the operation pole, the sealing lid having a curved lower surface portion which constitutes part of a sphere, the lower surface portion of the sealing lid having a curvature matching a curvature of the upper surface portion of the sealing plate, the sealing lid having an outer diameter larger than the central aperture of the sealing plate so that the sealing lid covers any gap between the operation pole and the sealing plate, the lower surface portion of the sealing lid being in direct contact with the upper surface portion of the sealing plate, wherein the sealing plate being movable with respect to both the sealing lid and the sealing table, and the upper surface of the sealing table is continuous from where the sealing table contacts the sealing plate to the main portion, such that the upper surface of the sealing table slopes away from the sealing plate until the sealing table meets the main portion.

14. A joy stick according to claim 13, wherein the operation pole moves in the x-axis and y-axis directions within the central aperture of the sealing plate until the operation pole contacts an inner diameter of the central aperture, and once the operation pole is in contact with the central aperture, the sealing plate and the operation pole move together.

15. A joy stick according to claim 13, wherein the sealing plate is made from a metal plate by pressing.

16. A joy stick according to claim 13, wherein the sealing lid is molded integrally with the operation pole in a resin molding process.

17. A joy stick according to claim 13, wherein the central aperture of the sealing plate is covered by the sealing lid.

18. A joy stick according to claim 13, wherein the sealing table is made from a molded resin.

* * * * *

UNITED STATES PATENT AND TRADEMARK OFFICE
CERTIFICATE OF CORRECTION

PATENT NO. : 10,353,423 B2
APPLICATION NO. : 15/354079
DATED : July 16, 2019
INVENTOR(S) : Masaru Miyachi It is certified that error appears in the above-identified patent and that said Letters Patent is hereby corrected as shown below:

In the Claims

Column 6, Line 44, In Claim 13, after "surface" delete "portion".

Signed and Sealed this
Tenth Day of September, 2019

Andrei Iancu
*Director of the United States Patent and Trademark Office*